United States Patent Office 3,153,383
Patented Oct. 20, 1964

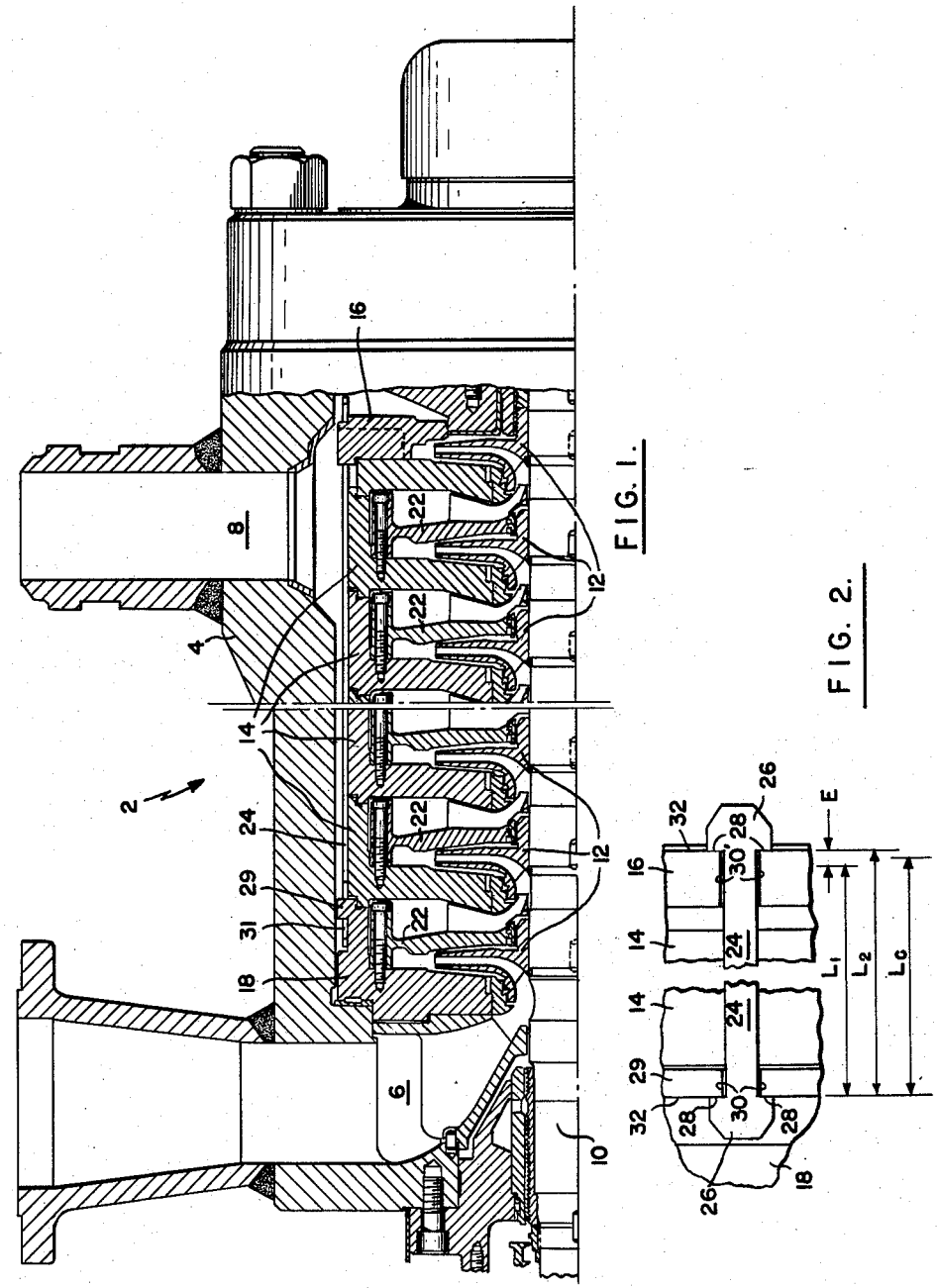

3,153,383
MEANS AND METHOD OF ASSEMBLING A PUMP, COMPRESSOR, TURBINE OR THE LIKE
Karol Pilarczyk, Morrisville, Pa., assignor, by mesne assignments, to De Laval Turbine Inc., Trenton, N.J., a corporation of New Jersey
Filed Aug. 11, 1961, Ser. No. 130,988
1 Claim. (Cl. 103—108)

This invention relates to the construction of a pump, compressor, turbine or the like, and more particularly to an improved arrangement for assembling and securing together the inner casing sections, or other parts, of the various stages.

Machines such as pumps, compressors and turbines, particularly those of the multi-stage type, commonly are constructed in parts, which may include as examples diffusor sections, nozzle sections, housings and miscellaneous sections. In a machine having many stages the overall length of such assembled sections may be considerable, and to secure these sections together tie bolts generally are employed. The use of bolts, however, has decided disadvantages: First, sections secured together by bolts are not easily assembled and disassembled, this disadvantage being felt at the manufacturing stage as well as in actual service, where the shut-down time required for repair or routine maintenance of a machine may be important. Secondly, tie bolts, which typically are anchored against flanges at the ends of an assembly of concentric sections, unavoidably add to the radial dimension of the assembly and increase space requirements. This latter factor may unduly increase the overall space requirement of the machine housings and/or may complicate the internal design thereof.

According to the specific embodiment of the invention disclosed hereafter, the above disadvantages of tie bolts are overcome by the use of flat steel members having shoulders which project over ledges provided at the ends of an assembly of sections to be secured together. This member is installed in a heated, thermally expanded, condition and is so dimensioned that when it cools it is placed under tension, thereby compressing the individual sections together. As will appear from the description hereafter, this member may be easily and quickly installed or removed and its space requirements are minimal.

Accordingly, it is an object of the invention to provide an arrangement for assembling and securing together the various sections of a machine which affords easy and quick assembly and disassembly and which has minimum space requirements.

Further objects and advantages will become apparent from the following description read in conjunction with the accompanying drawings, in which:

FIGURE 1 is an axial cross-section of the upper half of a multi-stage double case type pump wherein the sections of the various stages are secured according to the invention; and FIGURE 2 illustrates the mounting of a tie member in the end casing sections and the effect of heating and cooling thereof.

Although the invention is applicable to pumps, compressors and turbines, or other machines wherein parts typically are connected by tie bolts, referring to FIGURE 1 the invention will be described in connection with a multi-stage pump of double case type construction. There is illustrated in axial cross-section a pump 2 having an outer casing 4 in which are formed the intake volute 6 and a discharge connection 8. The pump 2 has a common shaft 10 on which are mounted the impellers 12 for the various stages. Pump 2 is of the double case type, in that there is an inner casing comprising an assembly of nested and concentric diaphragms 14, each providing the diffusor portion for one of the stages. The diaphragms 14 conventionally would be held together by tie bolts acting on the end diaphragms 16 and 18 or by short bolts bolting together the individual diaphragms 14. It will be understood that in the process of assembling the pump, the main shaft, impellers and diffusor elements are first fitted within the diaphragms which then must be held together as a rigid unit for handling and positioning within the outer casing. Actually, as more fully discussed hereafter, in operation the differential pressure between the intake and discharge of the pumps tends to hold the individual diaphragms together. Bolted to each of the diaphragms 14 and 18 are interstage diffusors 22 incorporating vanes for guiding the liquid in proper angular relationship with respect to the impeller of the next stage.

As previously stated, ordinarily, i.e. according to prior art practices, the diaphragms would be secured together axially by means of long tie bolts passing through and anchored at relatively large flanges on their end diaphragms. However, such an expedient has the disadvantages previously discussed, and in lieu thereof there are employed according to the invention flat oblong steel members 24 having end heads 26. The end heads 26 on the steel member 24 form shoulders 28 at a right angle to the length of the member. In a flange 29, projecting from end diaphragm 18, there are provided channels 30 having a width slightly greater than the width of a tie member 24. As shown particularly in FIGURE 2, when the member 24 is in place the shoulders 28 thereof extend beyond the width of channel 30 and engage the shoulders provided by the ledge 32, or the outer face of flange 29. Both ends of a member 24 are identical, and it will be noted that the right end thereof, as viewed in FIGURES 1 and 2, is mounted similarly in a channel 30' formed in the end diaphragm 16, the outer ledge or face 32' being engaged by shoulders 28.

Where bolts are employed to secure in nested relationship parts such as diaphragms 14, the nuts are run up on the bolts and tightened, placing the bolts in tension and producing a tight structure. The members 24, on the other hand, are tensioned by thermal contraction as will be presently described with particular reference to FIGURE 2. Initially, i.e. when the members 24 are at ambient temperature and before they are installed, the length $L_1$ thereof between shoulders 28 is less than the distance between the outer ledges 32 and 32' of end diaphragms 16 and 18. In practice, the sections first are assembled and placed in readiness to have the tie members 24 installed. Each member 24 is then heated, for example by a blowtorch or in an oven, to a temperature sufficient to produce an elongation E of the member due to thermal expansion which will result in a length $L_2$ between shoulders 28 that is slightly greater than the distance between ledges 32 and 32'. Immediately thereafter the member 24 is inserted in channels 30 and 30', the shoulders 28 then overlapping the respective ledges 32 and 32'. As the member 24 cools back to the ambient temperature its length will contract until the shoulders 28 engage and tighten against the ledges 32 and 32'. Further cooling will, of course, tension the member and exert a force against the ledges of the end sections to firmly secure the intermediate diaphragms 14 in assembled relationship.

In determining the dimension $L_1$ and other dimensions of the members such as thickness and width, there is first considered the force with which it is desired to secure the diaphragms 14. With this in mind, the cross-sectional area of the member is selected to obtain a satisfactory stress value. For this stress the strain, or elongation per unit length, is known as well as the total elongation for a given length. Accordingly, in machining the steel members 24 the distance $L_1$ between shoulder 28 is made less than the distance between the faces or ledges 32 and 32' by an amount E, or the total elongation needed to produce the desired stress in the member.

In connection with the above it is important to take into consideration the compression of the inner casing which occurs by virtue of the great differential pressure between the intake and discharge of the pump. Pressures of the order of three thousand p.s.i. are typical in pumps of this type, and such pressures are exerted axially against the sections of the inner casing at the discharge end (an equal and opposite reaction being exerted on the inner casing at the other end by the outer casing and by the inlet pressure), the resultant compression tending to decrease the distance between the ledges 32 and 32'. Such compression can cause the tie members 24, particularly those on the bottom side of the pump, to fall out under operating condition, which condition obviously is undesirable, unless care is taken in the dimensioning of the tie member. Thus, there should be considered the distance $L_c$, or the distance between the ledges or faces 32 or 32' due to compression of the inner casing when the pump is operating at rated capacity. Then, in machining the shoulders 28 at a distance $L_1$, this distance should be made slightly less than the distance $L_c$, whereby it will be insured that high pressures will not compress the inner casing sufficiently to permit the tie members 24 to loosen and fall out.

The assembly of an inner casing comprising diaphragms 14 by means of the tie members 24 may be effected quickly and easily. The elongation of the member necessary to permit its shoulders at both ends to be dropped over the flanges may be of the order of only a few hundredths of an inch, and may require heating the member to 300° F. or more. This heating can be readily effected in a matter of minutes by a blowtorch or other suitable means, and once this has been accomplished the positioning of the member in the channelled flanges is, of course, a relatively simple operation. Obviously the reverse operation, that is removal of the tie members, is equally simple. To illustrate a further previously mentioned advantageous feature of the invention, it will be noted that the thickness of the flat tie member 24 is relatively small in comparison to its width. It is not necessary that the height or radial extent of the flanges be any greater than this small thickness of the tie members. Therefore, it will be noted that the inner radius of the casing 4 may be only slightly greater than the radius of the casing comprising the assembly of diaphragms 14. This reduction in space, attributable to the use of tie members 24, naturally results in a pump having a smaller overall size and a correspondingly smaller space requirement.

Although the invention has been specifically described with reference to a double case type multi-stage pump, it is to be understood that the invention is not to be thus limited but is applicable to analogous situations wherein it is desired to assemble parts while conserving space and making quick assembly and disassembly possible. It will also be understood that various departures from the specifically disclosed embodiment of the invention may be made without departing from the scope thereof as defined by the following claim.

What is claimed is:

An assembly comprising a series of axially stacked cylindrical sections constituting the stages of a pump, compressor, turbine or the like, said series of sections having a pair of end sections and a plurality of intermediate sections between said end sections, each of said end sections only having means defining a flange having formed therein a plurality of outwardly open, axially directed channels, said flanges providing a pair of oppositely facing shoulders, said flanges on said end sections projecting radially outwardly of the cylindrical outer circumference of said intermediate sections, a plurality of tension members having a shank which extends axially of the assembly and enlarged ends which are engaged behind said opposite facing shoulders of said end sections for maintaining the assembled sections in axially compressed stacked relationship, said tension members comprising flat double-ended tie bars which extend parallel to the longitudinal axis of the assembly with the flat faces thereof being on the exterior of and substantially tangential to the outer circumference of said intermediate cylindrical sections, said heads of the tie bars being engaged respectively behind the oppositely facing shoulders provided by said flanges on said end sections, the shank of said tie bars extending through said channels in said end sections, said flanges on said end sections extending radially an amount approximately the same as the thickness of said tie bars.

References Cited in the file of this patent

UNITED STATES PATENTS

| | | |
|---|---|---|
| 746,440 | Austin | Dec. 8, 1903 |
| 1,389,154 | Newhouse | Aug. 30, 1921 |
| 1,516,110 | Mackley | Nov. 18, 1924 |
| 1,770,933 | Leake | July 22, 1930 |
| 2,161,695 | Biglow et al. | June 6, 1939 |
| 2,169,092 | Doran | Aug. 8, 1939 |
| 2,281,631 | Spillman et al. | May 5, 1942 |
| 2,365,310 | Thomann et al. | Dec. 19, 1944 |
| 2,984,899 | Richter et al. | May 23, 1961 |

FOREIGN PATENTS

| | | |
|---|---|---|
| 123,153 | Australia | Jan. 16, 1947 |

UNITED STATES PATENT OFFICE
CERTIFICATE OF CORRECTION

Patent No. 3,153,383                                October 20, 1964

Karol Pilarczyk

It is hereby certified that error appears in the above numbered patent requiring correction and that the said Letters Patent should read as corrected below.

In the grant, line 3, and in the heading to the printed specification, line 6, for "a corporation of New Jersey", each occurrence, read -- a corporation of Delaware --.

Signed and sealed this 13th day of July 1965.

(SEAL)
Attest:

ERNEST W. SWIDER                              EDWARD J. BRENNER
Attesting Officer                                     Commissioner of Patents